US012422009B2

(12) United States Patent
Kubota et al.

(10) Patent No.: US 12,422,009 B2
(45) Date of Patent: Sep. 23, 2025

(54) ROTATION TRANSMISSION DISC

(71) Applicant: SUNSTAR ENGINEERING INC., Osaka (JP)

(72) Inventors: Satoshi Kubota, Osaka (JP); Yuki Murayama, Shizuoka (JP)

(73) Assignee: SUNSTAR ENGINEERING INC., Osaka (JP)

( * ) Notice: Subject to any disclaimer, the term of this patent is extended or adjusted under 35 U.S.C. 154(b) by 0 days.

(21) Appl. No.: 18/760,264

(22) Filed: Jul. 1, 2024

(65) Prior Publication Data

US 2024/0352982 A1 Oct. 24, 2024

Related U.S. Application Data

(62) Division of application No. 17/441,069, filed as application No. PCT/JP2020/004091 on Feb. 4, 2020, now Pat. No. 12,055,191.

(30) Foreign Application Priority Data

Mar. 22, 2019 (JP) ................................ 2019-054374

(51) Int. Cl.
*F16H 55/30* (2006.01)
*F16D 13/60* (2006.01)
(Continued)

(52) U.S. Cl.
CPC ............ *F16D 65/12* (2013.01); *F16D 13/60* (2013.01); *F16H 55/30* (2013.01); *F16D 2065/1384* (2013.01)

(58) Field of Classification Search
CPC .. F16D 65/12; F16D 13/60; F16D 2065/1384; F16H 55/30
See application file for complete search history.

(56) References Cited

U.S. PATENT DOCUMENTS 4,576,587 A * 3/1986 Nagano .................. B62M 9/08
474/152
5,644,953 A 7/1997 Leng
(Continued)

FOREIGN PATENT DOCUMENTS

| JP | 11-22761 | 1/1999 |
| JP | 2009-250330 | 10/2009 |
| WO | 2005/040631 | 5/2005 |

OTHER PUBLICATIONS

International Search Report issued Apr. 7, 2020 in International Application No. PCT/JP2020/004091.
(Continued)

*Primary Examiner* — Thomas W Irvin
(74) *Attorney, Agent, or Firm* — Wenderoth, Lind & Ponack, L.L.P.

(57) ABSTRACT

A rotation transmission disc includes: an outer circumferential portion on which a load acts when rotation is transmitted; a center opening portion formed inside the outer circumferential portion; and a plurality of attachment holes for attachment of the rotation transmission disc 1 to a rotating element. A first crosspiece portions are formed in each of ranges of divided angles formed by two adjacent attachment holes with respect to a center of the rotation transmission disc. The first crosspiece portion extends from a load point, which is an intersection between a straight line extending in a radial direction to internally divide the divided angles at a predetermined angular ratio and a load radius position of the outer circumferential portion, to one of the attachment holes forming the divided angles. The second crosspiece portion extends from the load point to the other attachment hole of the attachment holes forming the divided angles.

3 Claims, 20 Drawing Sheets

(51) Int. Cl.
  *F16D 65/12* (2006.01)
  *F16D 65/02* (2006.01)

(56) References Cited

U.S. PATENT DOCUMENTS

| | | | | |
|---|---|---|---|---|
| 5,782,712 A * | 7/1998 | Campagnolo | ............ | F16H 55/08 474/160 |
| D545,333 S | 6/2007 | Clarke | | |
| 8,250,898 B2 | 8/2012 | Takenaka | | |
| 8,574,108 B2 | 11/2013 | Wang | | |
| 9,033,835 B2 | 5/2015 | Blank | | |
| 10,190,647 B2 | 1/2019 | Wen | | |
| 10,618,588 B2 | 4/2020 | Cody | | |
| 11,148,753 B2 | 10/2021 | Bush | | |
| 11,465,711 B2 | 10/2022 | Vonend | | |
| 11,554,407 B2 | 1/2023 | Takenaka | | |
| 11,578,761 B2 | 2/2023 | Oka | | |
| 11,859,682 B2 | 1/2024 | Kubota | | |
| 12,000,472 B2 * | 6/2024 | Kubota | ................ | F16H 55/30 |
| 2005/0092561 A1 | 5/2005 | Okabe | | |
| 2007/0144836 A1 | 6/2007 | Kunstle et al. | | |
| 2007/0187189 A1 | 8/2007 | Takeuchi | | |
| 2008/0041675 A1 | 2/2008 | Baumgartner | | |
| 2009/0139807 A1 | 6/2009 | Fryska | | |
| 2011/0312457 A1 * | 12/2011 | Wang | ................ | F16H 55/30 474/152 |
| 2013/0116074 A1 * | 5/2013 | Lin | .................. | B62M 9/00 474/152 |
| 2013/0143704 A1 * | 6/2013 | Blank | ................ | B62M 9/10 474/152 |
| 2016/0160947 A1 | 6/2016 | Wen | | |
| 2016/0215866 A1 * | 7/2016 | Stefan | .................. | F16H 55/12 |
| 2017/0198774 A1 | 7/2017 | Wen | | |
| 2017/0370431 A1 | 12/2017 | Dunlap | | |
| 2018/0094680 A1 | 4/2018 | Nakatsuji | | |
| 2018/0223931 A1 | 8/2018 | Meggiolan et al. | | |
| 2018/0304965 A1 * | 10/2018 | Fukumori | ................ | B62M 9/10 |
| 2019/0176920 A1 | 6/2019 | Cody | | |
| 2019/0185108 A1 | 6/2019 | Bush | | |
| 2022/0088667 A1 | 3/2022 | Takenaka | | |
| 2022/0154791 A1 | 5/2022 | Kubota | | |
| 2023/0204090 A1 * | 6/2023 | Kubota | .................. | F16H 55/30 474/152 |

OTHER PUBLICATIONS

Office Action issued Oct. 9, 2022 in corresponding Chinese Patent Application No. 202080023172.4, with English language translation.

Extended European Search Report issued Jan. 25, 2023 in corresponding European Patent Application No. 20778422.4.

* cited by examiner

ROTATION TRANSMISSION DISC

TECHNICAL FIELD

The present invention relates to a rotation transmission disc.

BACKGROUND ART

Many rotation transmission discs such as brake discs and sprockets are commonly required to achieve light weights while securing strengths.

However, models using brake discs and sprockets are configured to have mutually different layouts, product specifications are significantly different in accordance with used models and counterpart components, and for example, a variety of specifications are present for wheels that are components as attachment targets thereof.

SUMMARY OF INVENTION

Technical Problem

The present invention has been made in view of the aforementioned facts, and an object thereof is to provide a rotation transmission disc capable of achieving a light weight while securing strength under a variety of utilization conditions.

Solution to Problem

In order to solve the aforementioned problem, a rotation transmission disc according to the present invention includes: an outer circumferential portion on which a load acts when rotation is transmitted; a center opening portion formed inside the outer circumferential portion; and a plurality of attachment holes formed at positions projecting from the outer circumferential portion to inside of the center opening portion for attachment of the rotation transmission disc to a rotating element, a first crosspiece portion and a second crosspiece portion are formed in respective ranges of divided angles each of which is formed by any two adjacent attachment holes with respect to a center of the rotation transmission disc, the first crosspiece portion extending from a load point, which is an intersection between an internally dividing straight line extending in a radial direction to internally divide the divided angle at a predetermined angular ratio and an inner circumferential line with one radius inside a radius region of the outer circumferential portion adapted such that the load is applied, to one of the attachment holes forming the divided angle, the second crosspiece portion extending from the load point to the other attachment hole of the attachment holes forming the divided angle, and the first crosspiece portion and the second crosspiece portion inside a range of an adjacent divided angle intersect one another, and each of the attachment holes is located in the intersecting region.

Preferably, the intersecting region has a part formed by a plurality of arcs compositely connected to each other. Preferably, a recessed arc part is formed at a connecting part between the first and second crosspiece portions and the outer circumferential portion, and the recessed arc is formed of a plurality of arcs compositely connected to each other. More preferably, a curvature radius of the arcs is smaller than a radius of an inner circumference of the outer circumferential portion.

Each of the divided angles may be an equally divided angle that is substantially equal. Also, the plurality of attachment holes may be formed at positions at an equal distance from the center of the rotation transmission disc in the radial direction.

Preferably, only the first crosspiece portion and the second crosspiece portion intersect one another in the intersecting region. Also, a closed opening portion is formed by the first crosspiece portion and the second crosspiece portion, which intersect one another, and a circle of the outer circumferential portion.

Preferably, the predetermined angular ratio is 1:2 to 1:4. Further preferably, the predetermined angular ratio is 1:3.

The rotation transmission disc is attached to the rotating element so as to rotate with one of the first crosspiece portion and the second crosspiece portion with a shorter crosspiece length leading the rotation when the predetermined angular ratio is different from 1:1.

All the first crosspiece portions and the second crosspiece portions may be molded integrally with the outer circumferential portion. Alternatively, all the first crosspiece portions and the second crosspiece portions may form an integrally molded crosspiece inner circumferential portion, and the crosspiece inner circumferential portion may be coupled to the outer circumferential portion with coupling means.

One aspect of the rotation transmission disc is a brake disc. In this case, the outer circumferential portion has a surface to which a brake pad, for example, is applied. Also, the radius region of the outer circumferential portion adapted such that the load is applied is a region on which the brake pad abuts. Preferably, the outer circumferential portion of the brake disc includes a waveform portion.

Another aspect of the rotation transmission disc is a sprocket. In this case, sprocket teeth are formed at the outer circumferential portion. Also, the radius region of the outer circumferential portion adapted such that the load is applied is a region on which the load acts with a chain stretched over the sprocket teeth.

Yet another aspect of the rotation transmission disc is a clutch. In this case, the radius region of the outer circumferential portion adapted such that the load is applied is a region on which a member facing the clutch abuts.

A plurality of weight reducing holes may be formed in the outer circumferential portion.

DESCRIPTION OF EMBODIMENTS

Hereinafter, each embodiment of the present invention will be described with reference to the drawings.

First Embodiment

FIGS. 1 to 5 illustrate a rotation transmission disc 1 according to a first embodiment of the present invention. The rotation transmission disc 1 is implemented as a brake disc used in a bicycle, a motorcycle, or the like. Although aluminum or carbon steel, for example, may be used as a material of the rotation transmission disc 1, the present invention is not limited thereto.

Figure 1:
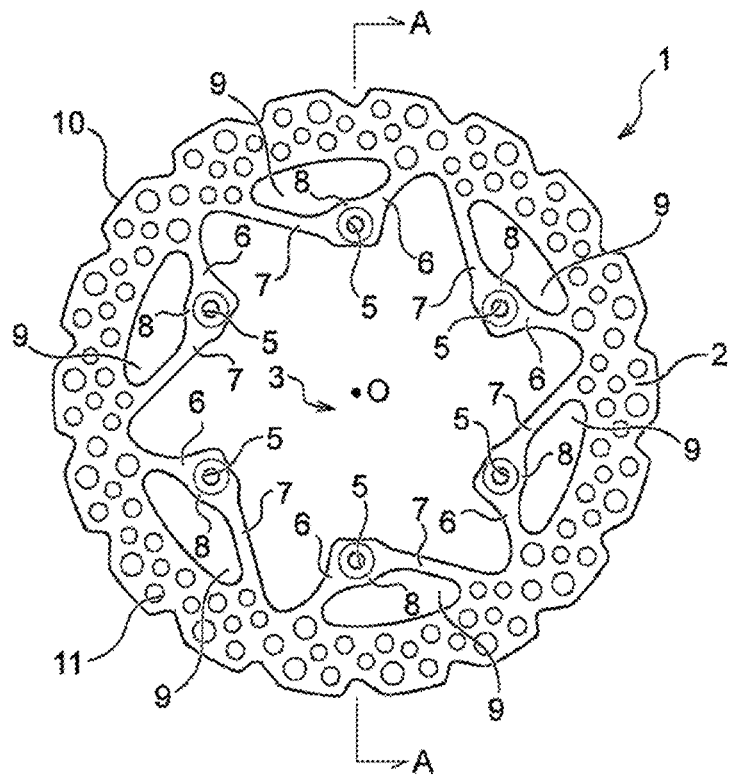
FIG. 1 is a front view of a rotation transmission disc (brake disc) according to a first embodiment of the present invention.
Figure 2:
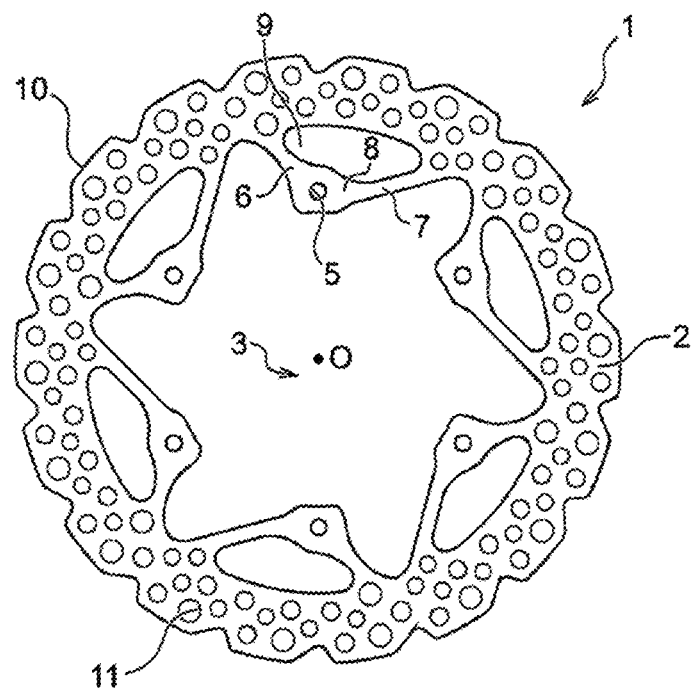
FIG. 2 is a back view of the rotation transmission disc according to the first embodiment.
Figure 3:
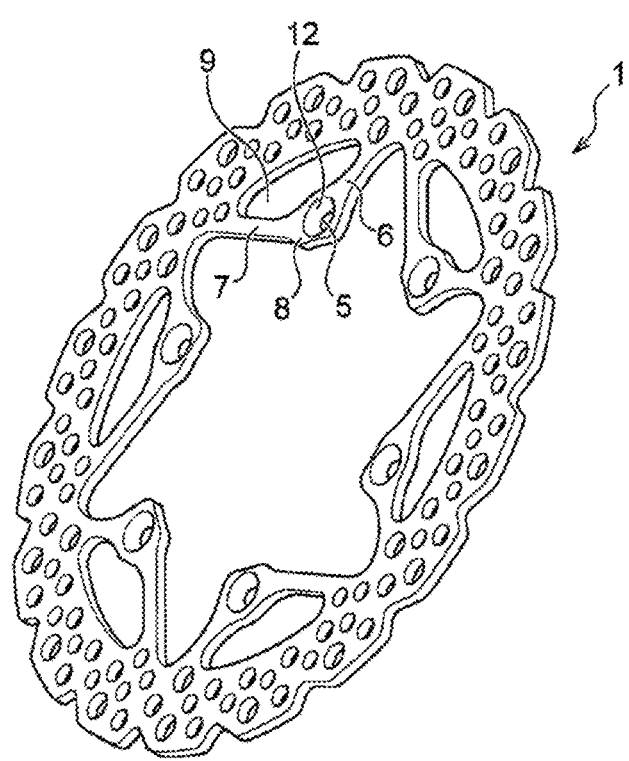
FIG. 3 is a perspective view of the rotation transmission disc according to the first embodiment.

As is best illustrated in FIGS. 1 to 3, the rotation transmission disc 1 includes an outer circumferential portion 2 on which a load acts when rotation is transmitted, a center opening portion 3 formed inside the outer circumferential portion 2, and a plurality of attachment holes 5 formed at positions projecting from the outer circumferential portion 2 to inside of the center opening portion 3 for attachment of the rotation transmission disc 1 to a rotating element (not illustrated) such as a wheel.

In the example in FIGS. 1 to 5, six attachment holes 5 are provided. In the illustrated example, the six attachment holes 5 are distributed in a circumferential direction such that center angles (divided angles) formed by two adjacent attachment holes 5 and 5 with respect to the center of the rotation transmission disc are equally divided angles that are substantially equal. In the case in which the number of the attachment holes 5 is six, the equally divided angle is 360°/6=60°. Since arrangement of the attachment holes 5 is determined in accordance with a specification of the rotating element, such as a wheel, to which the rotation transmission disc 1 is attached, the divided angles are not necessarily equally divided angles that are equal to each other. For example, the present invention can be applied to a case in which the divided angles are not uniform (may be partially uniform), such as 50°, 55°, 60°, 65°, . . . , in accordance with the specification of the wheel.

Also, in the example in FIGS. 1 to 5, the attachment holes 5 are formed at positions at an equal distance from a center O of the rotation transmission disc in a radial direction. However, in this regard as well, the arrangement of the attachment holes 5 is determined in accordance with the specification of the wheel or the like, the distances of the attachment holes 5 in the radial direction from the center O are thus not necessarily equal to each other and may be different from each other (may partially include equal radii), and it is possible to apply the present invention to this case as well.

Each attachment hole 5 is formed in a region 8 at which a first crosspiece portion 6 extending from the outer circumferential portion 2 to the inside of the center opening portion 3 at an angle inclined relative to the radial direction (a direction extending in the direction of the radius from the disc center O) and a second crosspiece portion 7 extending from the outer circumferential portion 2 to the inside of the center opening portion 3 at an angle inclined relative to the radial direction intersect one another. The first crosspiece portion 6, the second crosspiece portion 7, and the intersecting region 8 form, along with the outer circumferential portion 2, each circumferential opening portion 9. Only the first crosspiece portion 6 and the second crosspiece portion 7 cross the intersecting region 8, and there are no parts crossing the intersecting region 8 other than the crosspiece portions.

A flower petal-shaped waveform portion 10 composed of repeated irregularities is formed at an outer edge of the outer circumferential portion 2, and weight reducing holes 11 are formed in the outer circumferential portion 2. The outer circumferential portion 2 has a surface, to which a brake pad that is not illustrated can be applied, including projecting portions of the waveform portion 10. For example, the brake pad may apply a brake force to the rotation transmission disc by a pair of pads abutting on the outer circumferential portion 2 from both surfaces, namely a front surface and a back surface. Therefore, when the brake pad abuts on the outer circumferential portion 2 and applies the brake force when rotation is transmitted, load is applied directly to the outer circumferential portion 2 in a direction opposite to a rotation direction of the rotation transmission disc 1. Also, the flower petal-shaped waveform portion 10 enables a small amount of powder generated through wear of the brake pad to be removed. Note that it is a matter of course that the present invention is not limited to the brake disc including the waveform portion 10 and can be applied to a circular-shaped brake disc or the like with no waveform portion.

Figure 4:
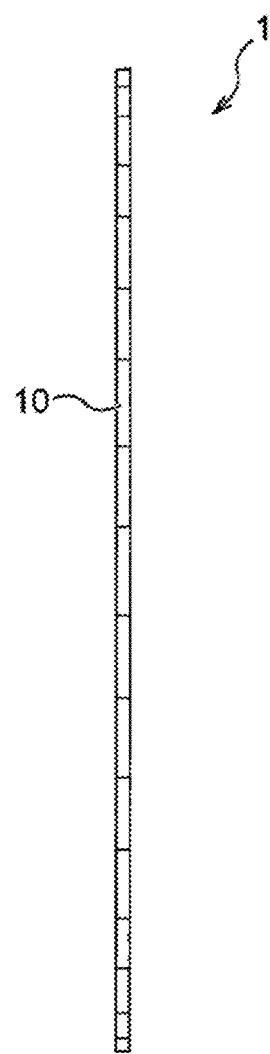
FIG. 4 is a side view of the rotation transmission disc according to the first embodiment.

As is obvious from the side view of FIG. 4, the rotation transmission disc 1 is formed into a plate shape such that the outer circumferential portion 2, the first crosspiece portion 6, the second crosspiece portion 7, the intersecting region 8, and the waveform portion 10 fall within a predetermined thickness range.

Figure 5:
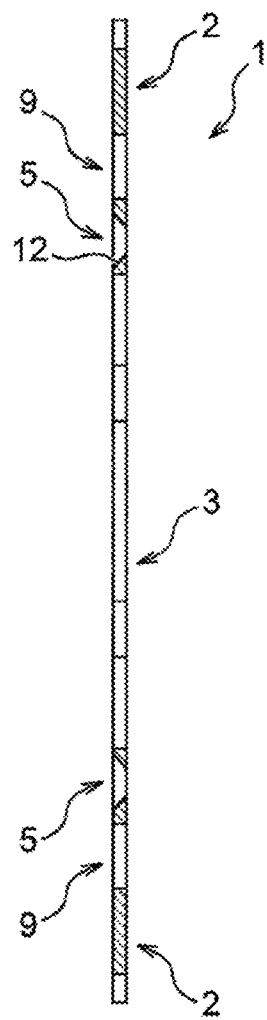
FIG. 5 is a sectional view of the rotation transmission disc according to the first embodiment taken along the line A-A in FIG. 1.

The rotation transmission disc 1 is attached to the wheel with a back side surface illustrated in FIG. 2 pressed against the wheel and with bolts screwed into screw holes in the wheel through the attachment holes 5 from a front side surface illustrated in FIG. 1. Therefore, the attachment holes 5 have dish-shaped recessed parts 12 (FIG. 3) in the front side surface such that bolt heads can be seated as illustrated in FIGS. 1, 2, and 5.

Next, a method of determining an angular ratio of the first crosspiece portion 6 and the second crosspiece portion 7 and thus inclination angles of the crosspiece portions relative to the radial direction will be described using FIG. 6.

Figure 6:
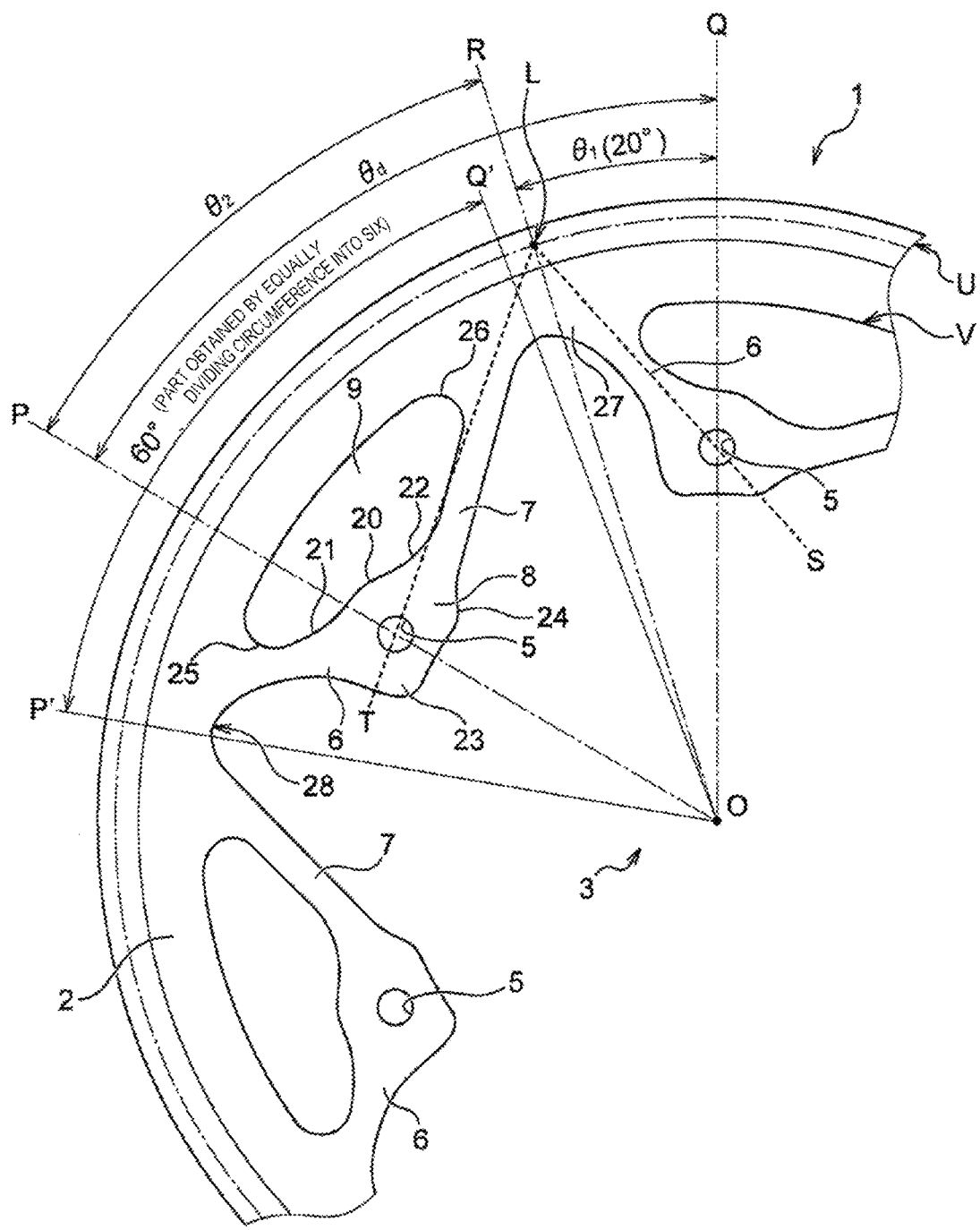
FIG. 6 is a diagram for explaining center angles of adjacent attachment holes and an angular ratio between first and second crosspiece portions in the rotation transmission disc according to the first embodiment.

FIG. 6 (which is a view when seen from the back surface side illustrated in FIG. 2 with no illustration of the waveform portion 10) illustrates a divided angle $\theta_d$ which is a center angle of two adjacent attachment holes 5 and 5 among the attachment holes in the rotation transmission disc 1. The divided angle $\theta_d$ is an angle formed by straight lines P and Q, each of which passes through the center of each of the two adjacent attachment holes 5 and 5 from the center O of the disc, and in a case in which the number of attachment holes 5 is six and the divided angle is an equally divided angle as described above, $\theta_d=60°$.

Here, the internally dividing straight line R extending from the center O to internally divide the divided angle θd at a predetermined ratio $\theta_1:\theta_2$ will be considered. At this time, a position where the internally dividing straight line R intersects one inner circumferential line U of a radius region of the rotation transmission disc 1, on which a load is to be applied, will be defined as a load point L. In the case in which the rotation transmission disc 1 is a brake disc, the radius region of the rotation transmission disc 1, on which the load is to be applied, is the outer circumferential portion 2, that is, a radius region to which the brake pad is applied and a load is directly transmitted, and it is possible to select one radius inside such a radius region and to regard the intersection between the inner circumferential line U with the radius and the internally dividing straight line R as the load point L. For example, the radius region is a region with a radius ranging from an outer circumferential radius of the waveform portion 10 to a radius that is greater than the radius of an inner circumference V of the outer circumferential portion 2 by a predetermined length (1.5 mm, for example). A position (a position corresponding to the center of gravity of the brake pad, for example) estimated to have a maximum load applied thereto may be specified, and an intersection between an inner circumferential line with the radius at the position at which the maximum load is given and the internally dividing straight line R may be defined as the load point L.

Two straight lines S and T extending from the load point L to the two attachment holes 5 and 5 defining the divided angle can be determined, and the inclination angles of the first crosspiece portion 6 and the second crosspiece portion 7 can be determined such that the first crosspiece portion 6 and the second crosspiece portion 7 extend in the directions along the straight lines S and T from the outer circumferential portion 2 to the center opening 3.

In other words, when the positions of the plurality of attachment holes 5 are given in accordance with the specification of the wheel, it is possible to appropriately disperse a stress while achieving a light weight through presence of the center opening portion 3 and the circumferential opening portion 9 by appropriately adjusting the predetermined ratio $\theta_1:\theta_2$ for internally dividing the divided angle $\theta_d$ to configure the rotation transmission disc 1, and thereby to maintain disc strength.

Note that the ranges P to Q of the divided angle are ranges that cover the first crosspiece portion 6 and the second crosspiece portion 7 supporting one attachment hole 5 as illustrated as P' to Q' obtained by causing the ranges to rotate in the counterclockwise direction.

In the example in FIG. 6, $\theta_1=20°$, $\theta_2=40°$, and the predetermined ratio is 1:2. The rotation transmission disc 1 is attached to the wheel such that one of the first crosspiece portion 6 and the second crosspiece portion 7 with a shorter crosspiece length, that is, the first crosspiece portion 6 in the example in FIG. 6 leads rotation and the rotation direction is a forward direction (that is, the direction opposite to the direction in which a brake force is applied). As illustrated in FIG. 1, the forward direction is a counterclockwise direction when the rotation transmission disc 1 is seen from the back surface side as illustrated in FIGS. 2 and 6, and the forward direction is a clockwise direction when the rotation transmission disc 1 is seen from the front surface side (however, when the predetermined angular ratio is 1:1, the first crosspiece portion 6 and the second crosspiece portion 7 have an equal length and extend at an equal inclination angle relative to the radial direction, and the rotation transmission disc 1 may be caused to rotate with both the rotation directions regarded as a forward rotation direction; however, in a case in which the thicknesses of the first and second crosspiece portions are different, a direction that a thicker crosspiece portion leads is to be regarded as a forward direction even when the predetermined angular ratio is 1:1).

More preferably, as illustrated in FIG. 6, the intersecting region 8 may have a part formed by a plurality of arcs 20, 21, 22, 23, and 24 compositely connected to each other. Here, the arcs 20, 23, and 24 are projecting arcs while the arcs 21 and 22 are recessed arcs. Preferably, recessed arc parts 25, 26, 27, and 28 are formed at a connecting part of the first crosspiece portion 6, the second crosspiece portion 7, and the outer circumferential portion 2. The arcs 21 to 28 are formed to have a smaller curvature radius than the radius of the inner circumference V of the outer circumferential portion 2.

Compositely forming the arcs 27 and 28 with a plurality of arcs and setting the curvature radius of a composite circle of the arcs 27 and 28 to be smaller than the radius of the inner circumference V, in particular, enable effective prevention of stress concentration.

It is possible to prevent local concentration of a stress and to secure the strength of the entire rotation transmission disc 1 by forming the arcs in this manner.

Next, results of analyzing a stress and a weight of each sample when the predetermined angular ratio was changed in various manner will be described using FIGS. 7A to G.

In FIGS. 7A to G, analysis was carried out under analysis conditions that the attachment holes 5 were completely constrained as a constraint condition and a load was applied to all the samples under the same conditions (a radius position, a circumferential position, and an input load) as load conditions. The analysis was carried out by changing only the angles ($\theta_1$ and $\theta_2$) of the first and second crosspiece portions while setting the shape specifications: outer diameters, inner diameters, plate pressures, attachment holes (diameters, P.I.D, equally divided angles), load part shapes, and the like to be the same as sample conditions. Also, the number of the attachment holes was 6 and the equally divided angle $\theta_d$=60° in all the samples, and a total of seven samples with the predetermined angular ratio $\theta_1:\theta_2$ of 1:1, 1:2, 1:3, ..., 1:7 obtained by further equally dividing the equally divided angle (into two to eight parts) were used. Among these, a sample (1) with an angular ratio $\theta_1:\theta_2$=1:1 (FIG. 7A) was used as a benchmark (the results of the stress were different at the angular ratio $\theta_1:\theta_2$=1:1 for forward rotation and backward rotation because the thicknesses of the first and second crosspiece portions were different).

Figure 7A:
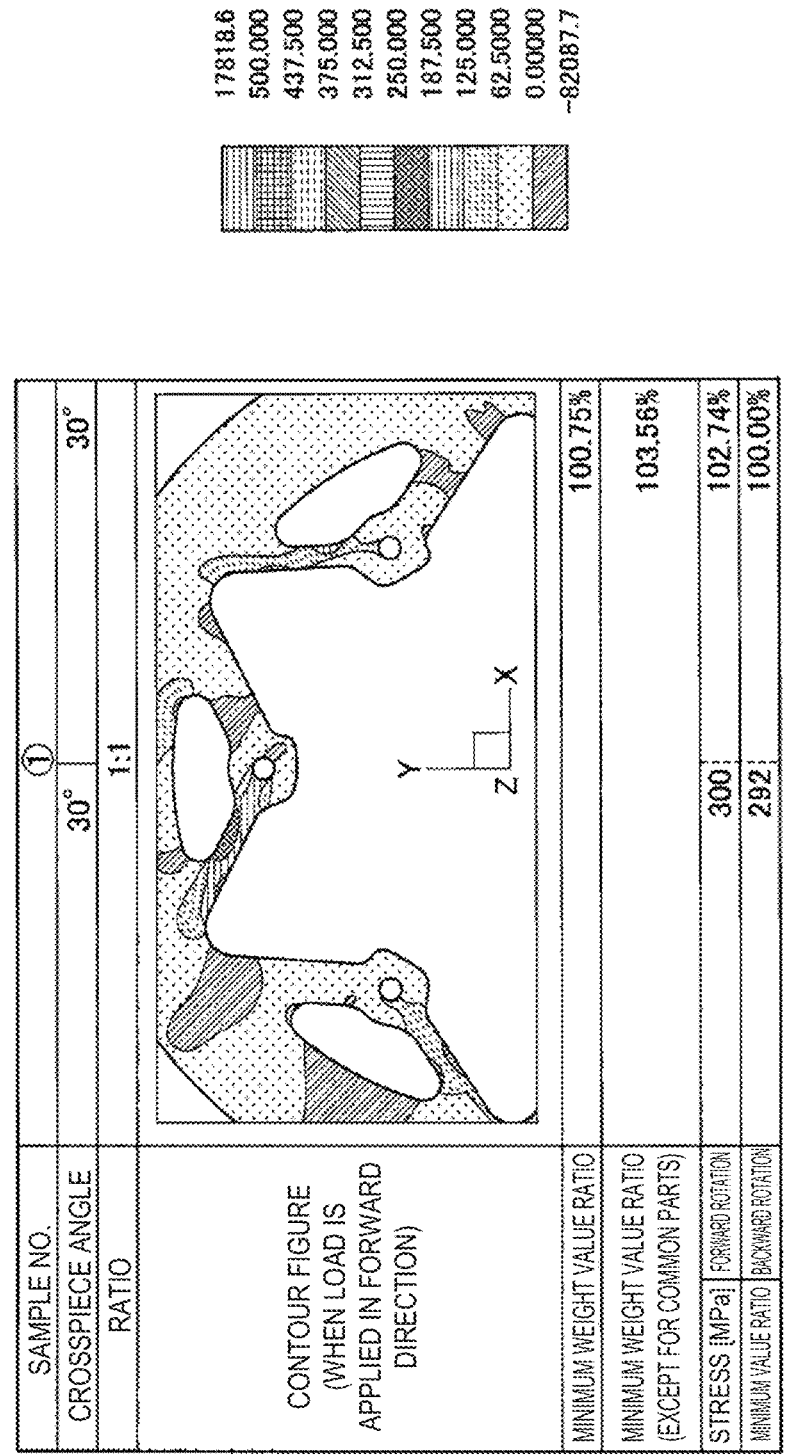
FIG. 7A is a diagram illustrating stress distribution and results of analyzing a weight ratio and a stress when the angular ratio of the rotation transmission disc according to the first embodiment is set to 1:1.
Figure 7B:
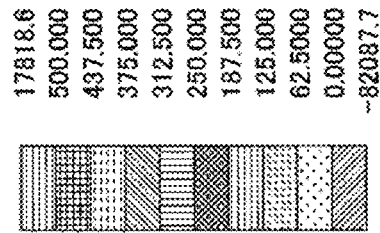
FIG. 7B is a diagram illustrating stress distribution and results of analyzing a weight ratio and a stress when the angular ratio of the rotation transmission disc according to the first embodiment is set to 1:2.
Figure 7B:
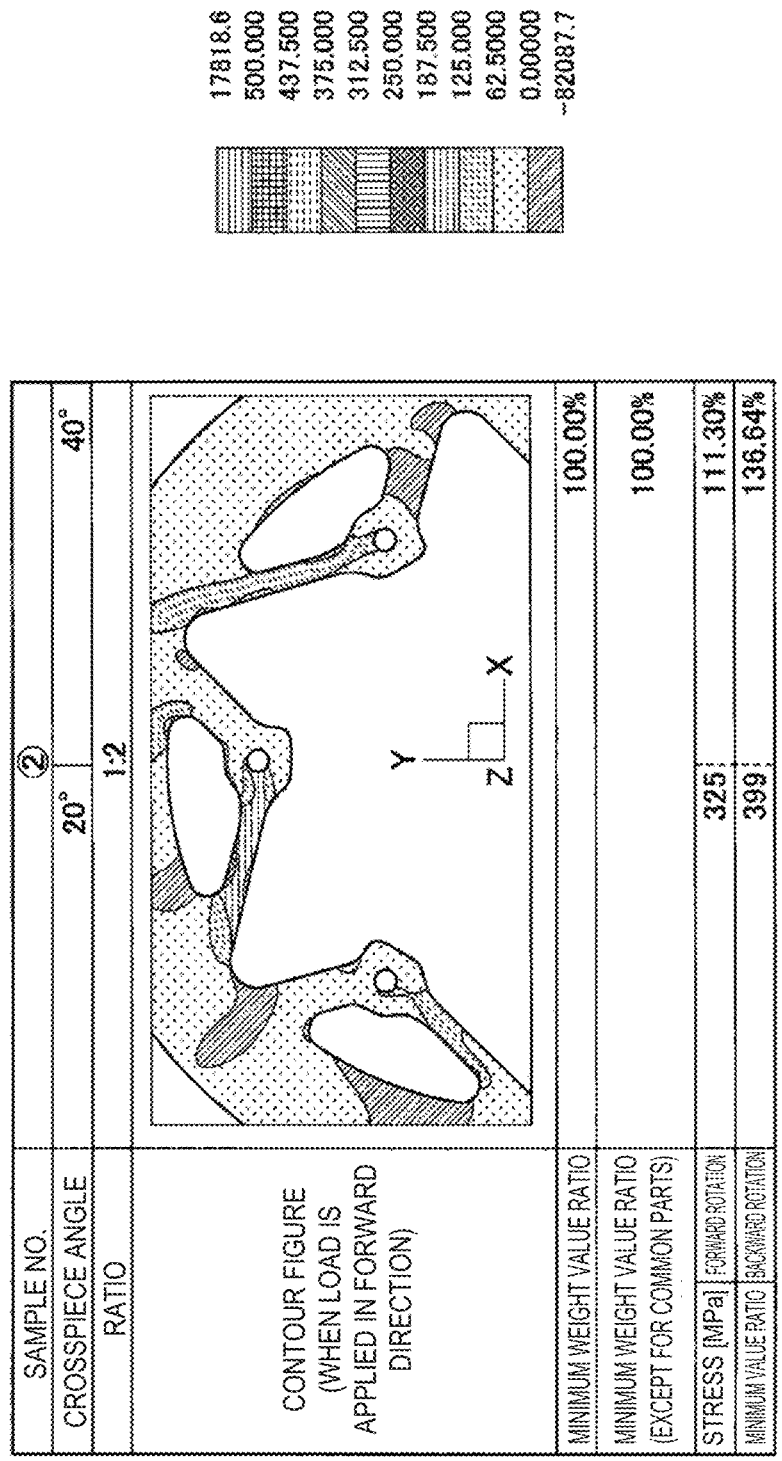
Figure 7C:
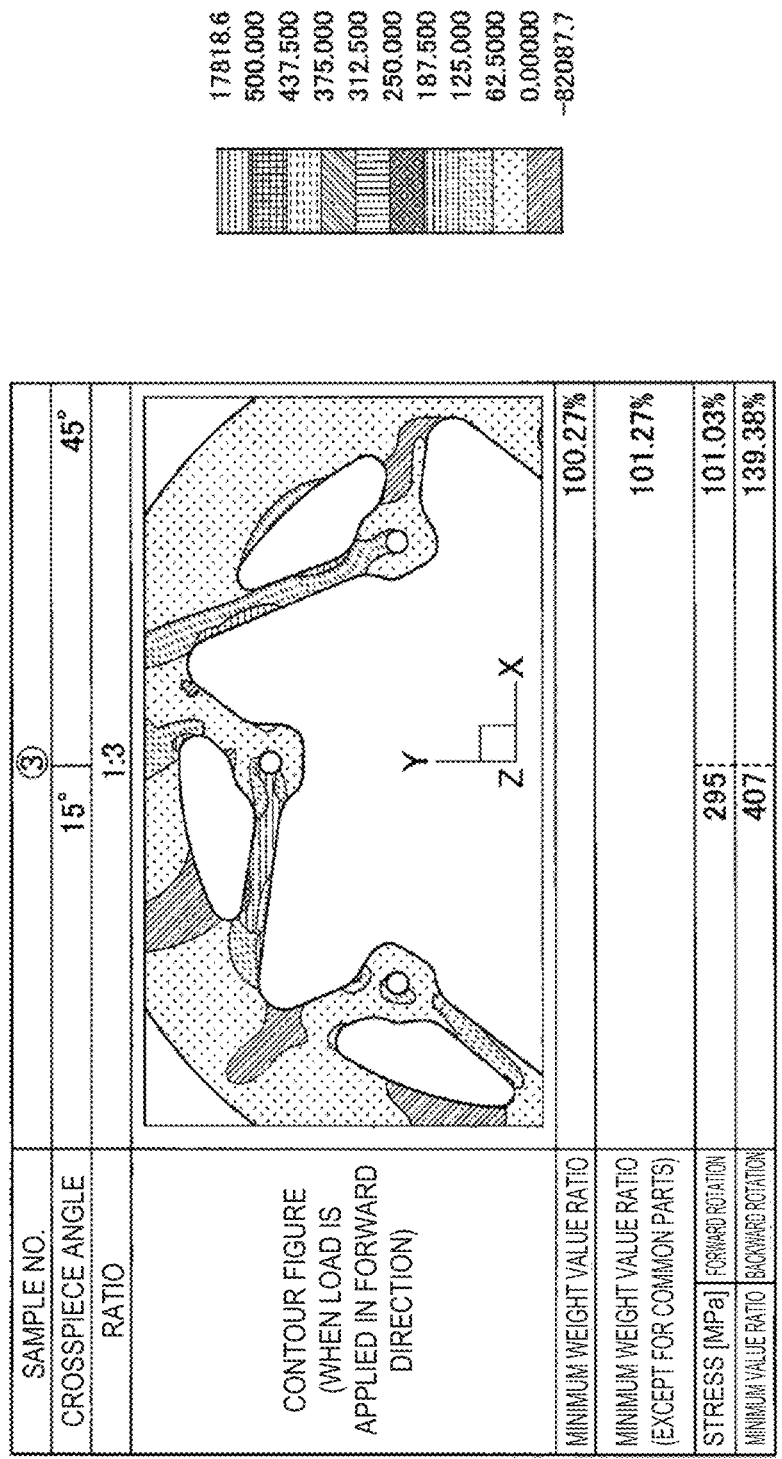
FIG. 7C is a diagram illustrating stress distribution and results of analyzing a weight ratio and a stress when the angular ratio of the rotation transmission disc according to the first embodiment is set to 1:3.
Figure 7D:
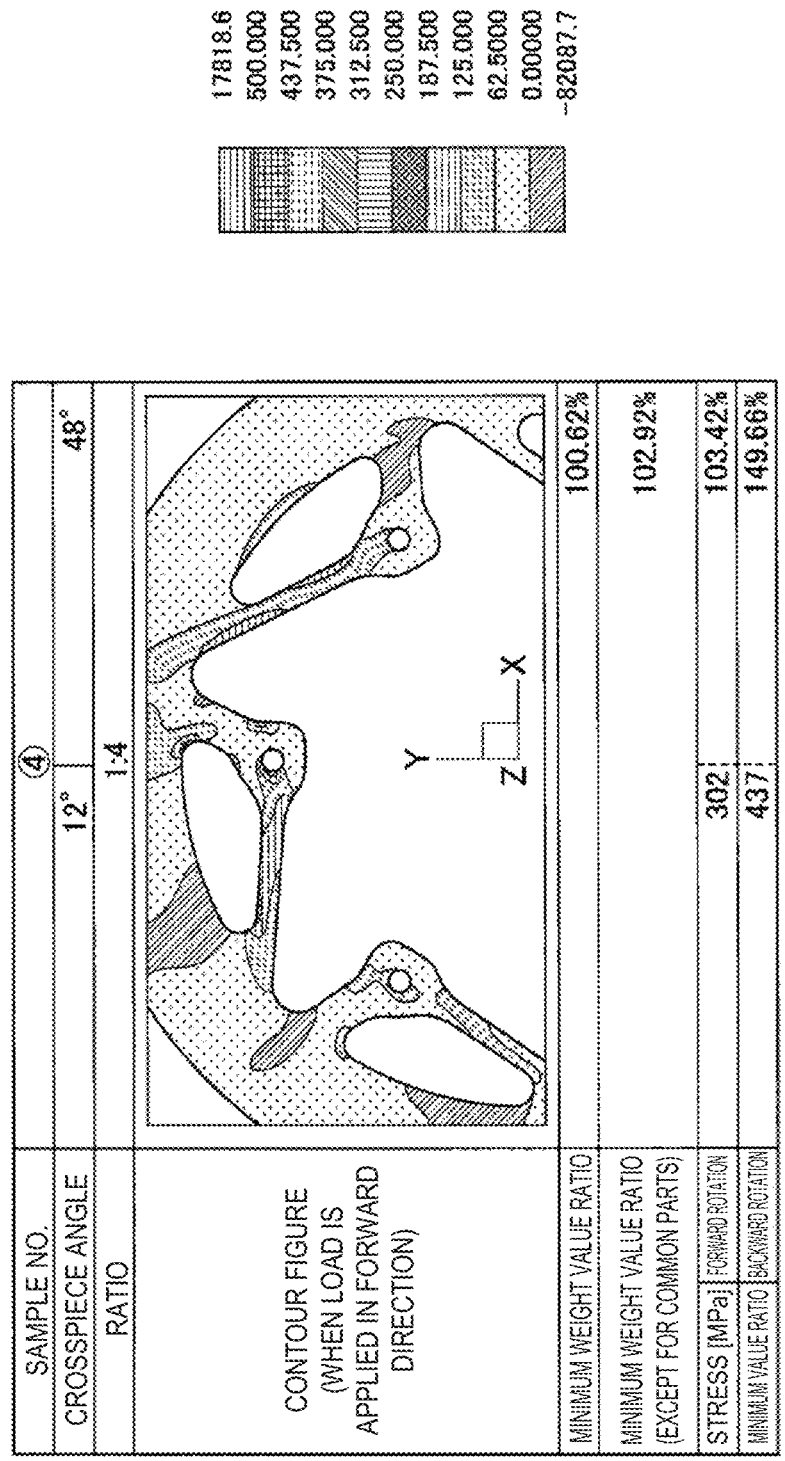
FIG. 7D is a diagram illustrating stress distribution and results of analyzing a weight ratio and a stress when the angular ratio of the rotation transmission disc according to the first embodiment is set to 1:4.
Figure 7E:
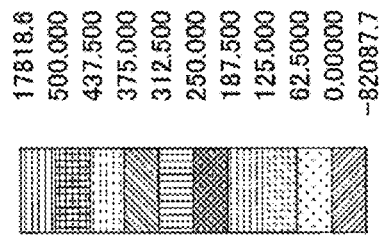
FIG. 7E is a diagram illustrating stress distribution and results of analyzing a weight ratio and a stress when the angular ratio of the rotation transmission disc according to the first embodiment is set to 1:5.
Figure 7E:
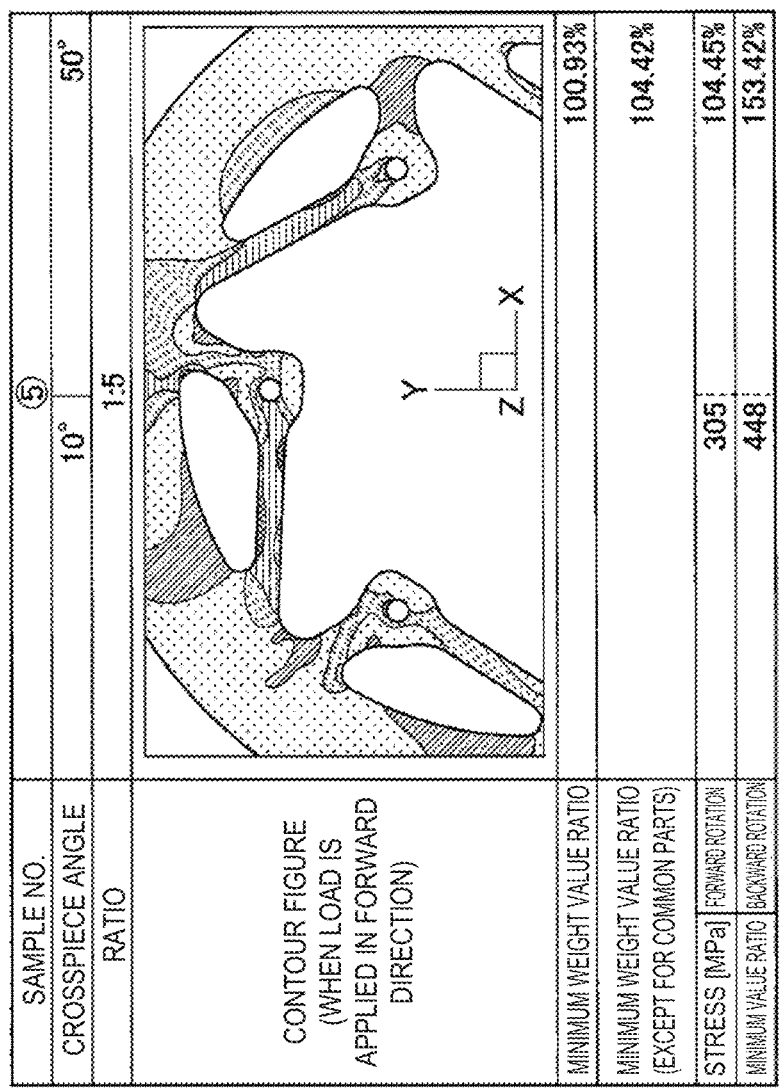
Figure 7F:
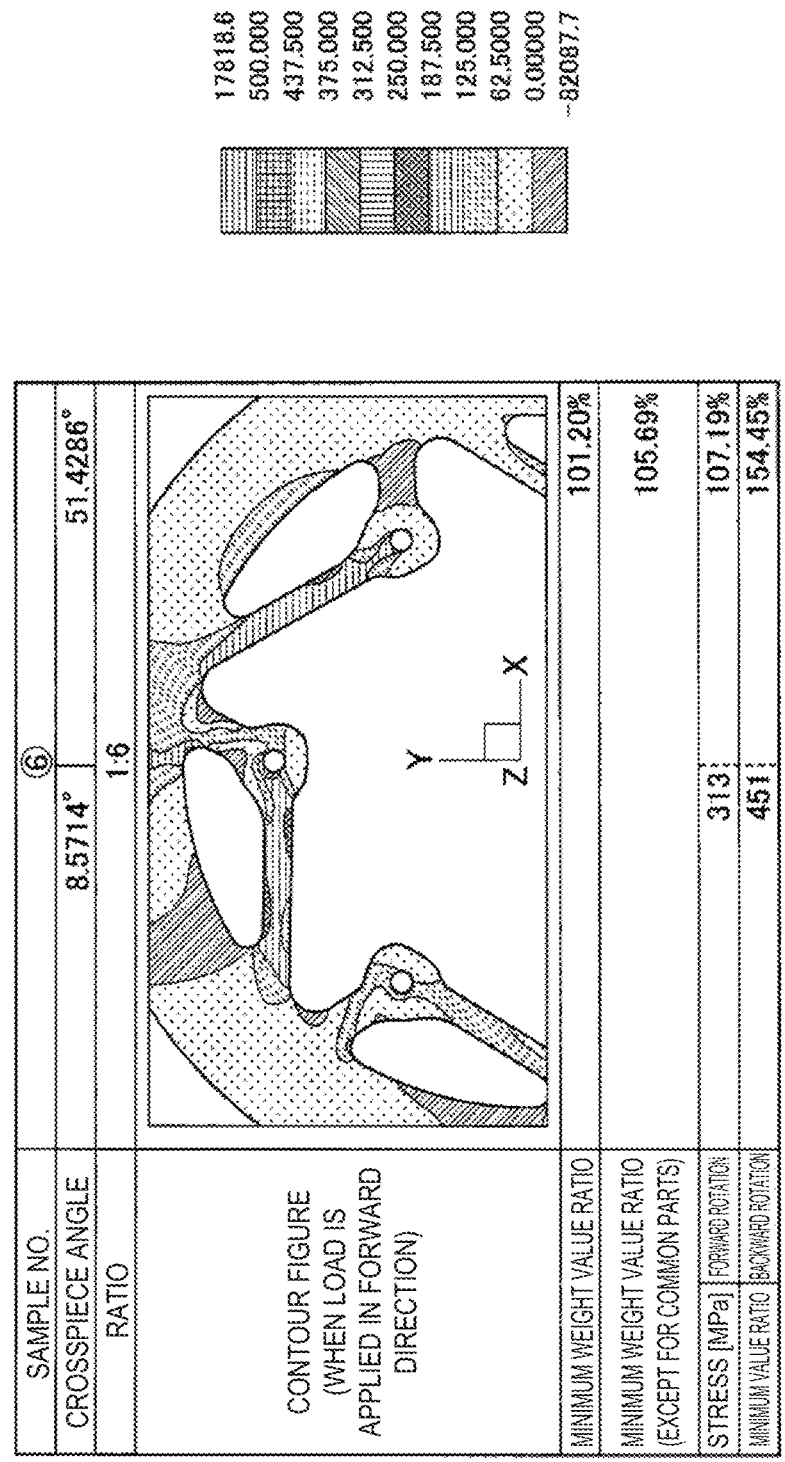
FIG. 7F is a diagram illustrating stress distribution and results of analyzing a weight ratio and a stress when the angular ratio of the rotation transmission disc according to the first embodiment is set to 1:6.
Figure 7G:
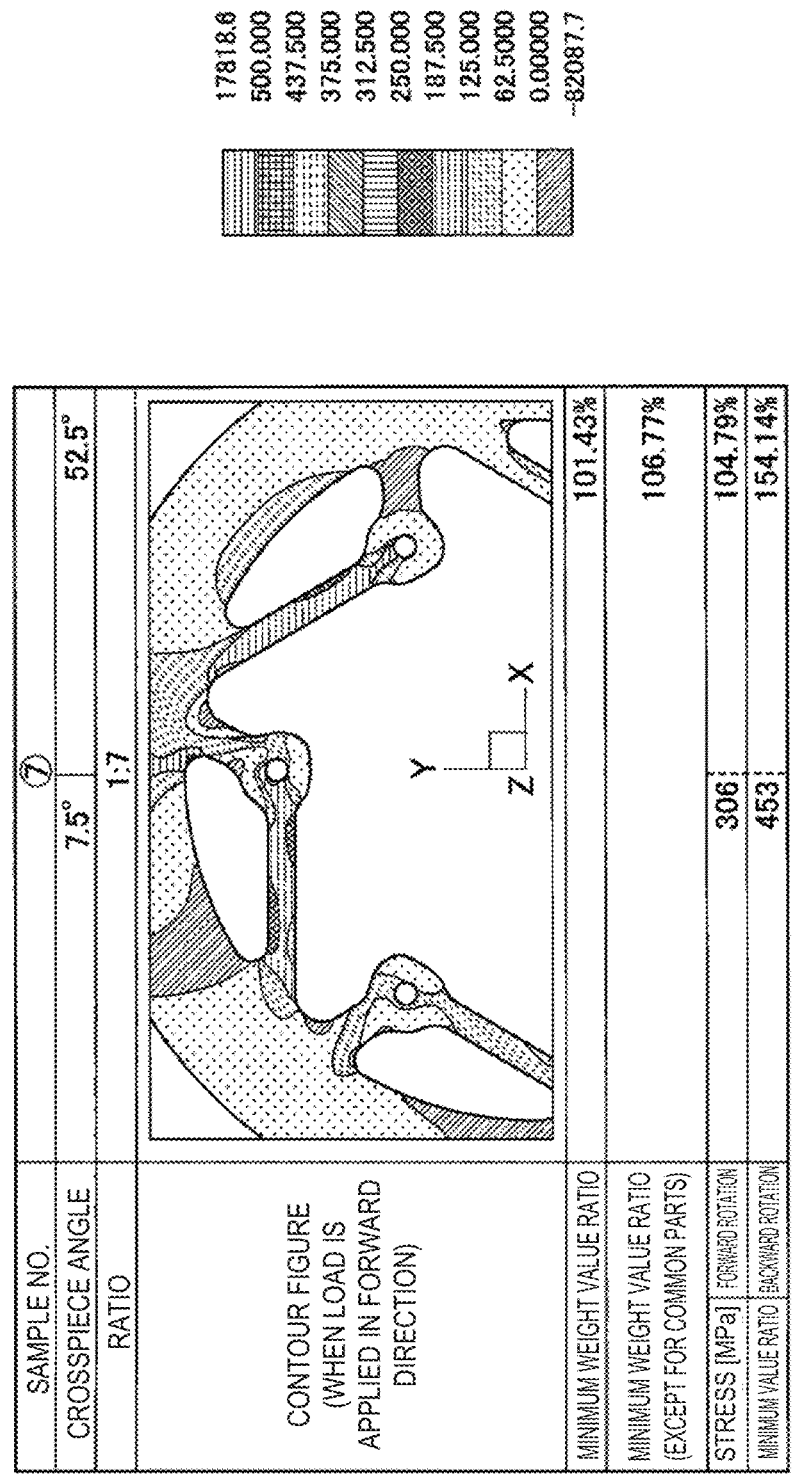
FIG. 7G is a diagram illustrating stress distribution and results of analyzing a weight ratio and a stress when the angular ratio of the rotation transmission disc according to the first embodiment is set to 1:7.
Figure 8:
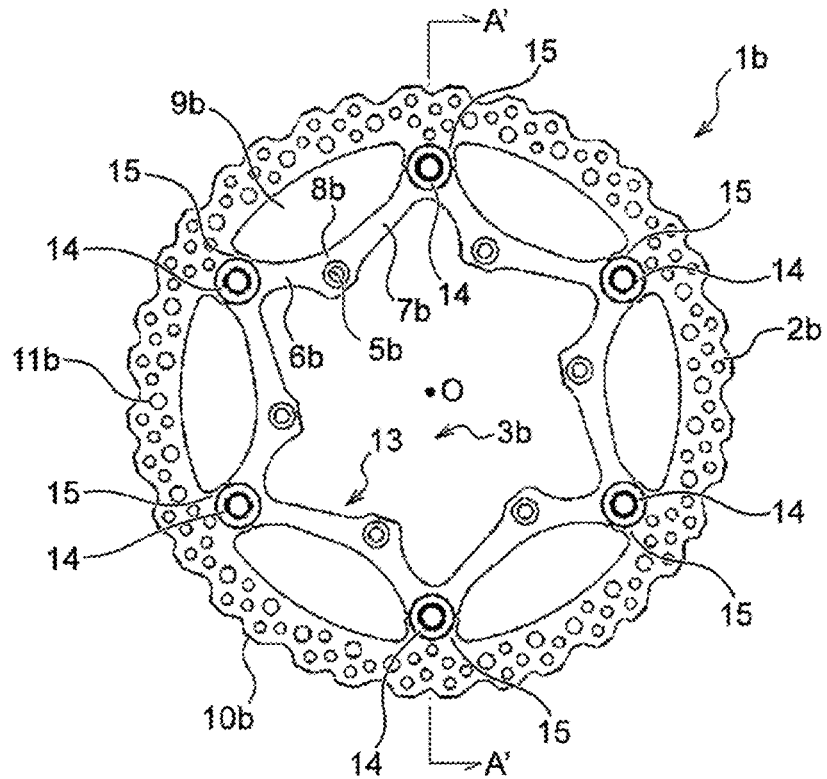
FIG. 8 is a front view of a rotation transmission disc (brake disc) according to a second embodiment of the present invention.
Figure 9:
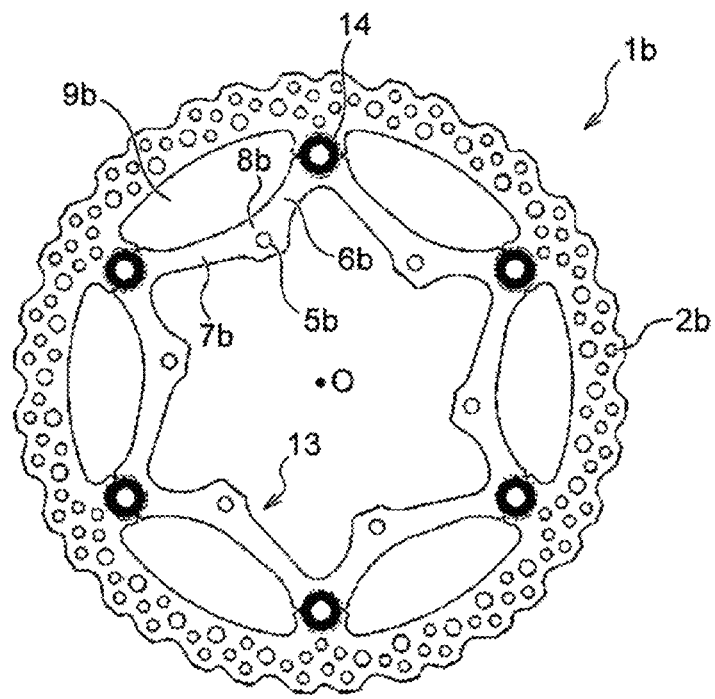
FIG. 9 is a back view of the rotation transmission disc according to the second embodiment.
Figure 10:
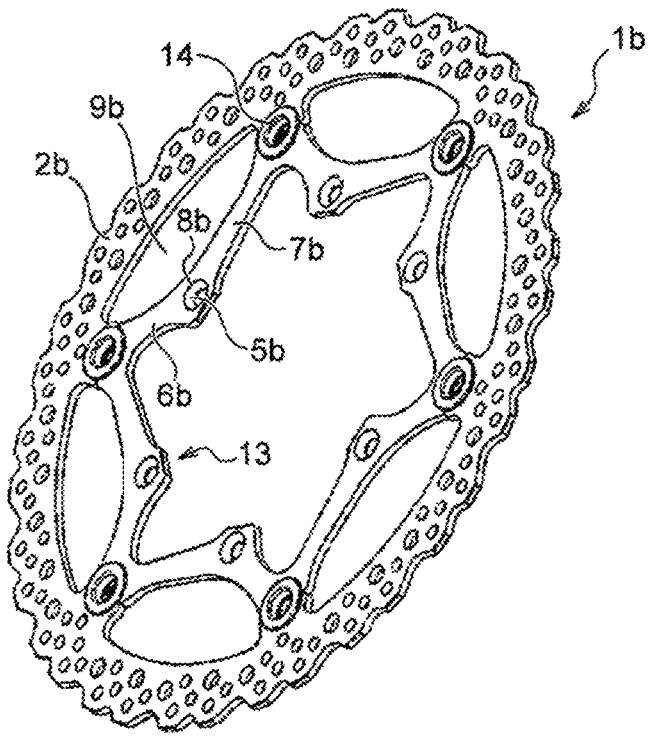
FIG. 10 is a perspective view of the rotation transmission disc according to the second embodiment.
Figure 11:
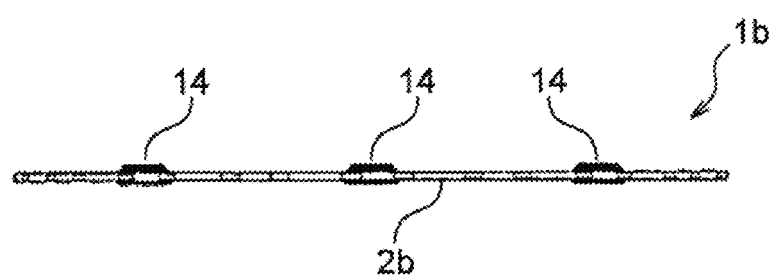
FIG. 11 is a side view (a side view when seen from a direction along the line A'-A' in FIG. 8) of the rotation transmission disc according to the second embodiment.
Figure 12:
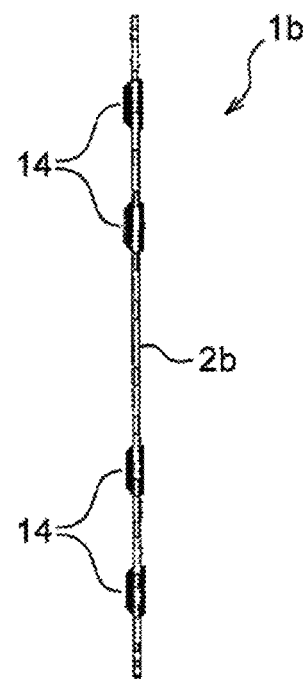
FIG. 12 is a side view (a side view when seen from a direction perpendicular to the line A'-A' in FIG. 8) of the rotation transmission disc according to the second embodiment.
Figure 13:
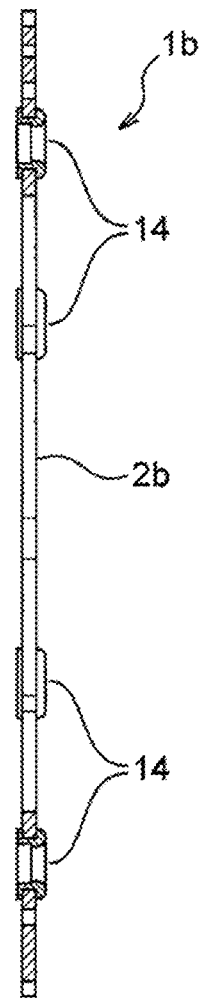
FIG. 13 is a sectional view of the rotation transmission disc according to the second embodiment taken along the line A'-A' in FIG. 1.

As illustrated in FIGS. 7A to G, a sample (2) with $\theta_1:\theta_2$=1:2 (FIG. 7B), a sample (3) with $\theta_1:\theta_2$ of 1:3 (FIG. 7C), and a sample (4) with $\theta_1:\theta_2$ of 1:4 (FIG. 7D) were significant with respect to the sample (1) in terms of weights. Among these, the sample having a minimum weight regardless of presence/absence of common parts was the sample (2) with $\theta_1:\theta_2$ of 1:2 (FIG. 7B), and the samples (3) and (4) (FIGS. 7C and 7D) followed the sample (2). Also, the sample from which the smallest maximum value (295 MPa) of a local stress was observed in forward rotation was the sample (3) (FIG. 7C). In other words, the sample (3) was estimated to be able to secure disc strength due to the small maximum value of a local stress. The minimum stress of the sample (3) was a value that was close to the lowest stress (292 MPa in the backward rotation) observed from the sample (1). Therefore, the samples (2), (3), and (4) were considered to be preferable examples in terms of weight reduction and securing of the strength.

Second Embodiment

In the first embodiment, the entire rotation transmission disc 1 is integrally molded. The rotation transmission disc according to the present invention is not limited thereto and may be composed of two or more parts. This example will be described as a second embodiment using FIGS. 8 to 13. Note that for configuration requirements in the second embodiment similar to those in the first embodiment, b will be applied to the same reference signs as those in the first embodiment, and detailed description will be omitted.

As illustrated in FIGS. 8 to 13, a rotation transmission disc 1b according to the second embodiment includes an outer circumferential portion 2b and a crosspiece inner circumferential portion 13, and the crosspiece inner circumferential portion 13 is coupled to the outer circumferential portion 2b via pins 14 and a plurality of bridge portions 15 extending from the outer circumferential portion 2b to the center opening portion 3b.

All first crosspiece portions 6b and second crosspiece portions 7b of the rotation transmission disc 1b are integrally molded in the crosspiece inner circumferential portion 13, and each attachment hole 5b is formed in each of intersecting regions 8b between the first and second crosspiece portions. Note that the plurality of attachment holes 5b include attachment holes at different distances from the center O.

Note that the composite arc parts 20 to 24 and the recessed stretching parts 25 to 27 may be formed in the second embodiment as well.

According to the second embodiment, it is possible to provide a rotation transmission disc that can be compatible with a specification of a wheel merely through exchange of the crosspiece inner circumferential portion 13, in addition to advantageous effects similar to that of the first embodiment. Conversely, it is also possible to exchange only the outer circumferential portion 2b due to wear or the like.

Third Embodiment

In the first and second embodiments, the rotation transmission disc according to the present invention is configured as a brake disc. In the third embodiment, the rotation transmission disc according to the present invention is configured as a sprocket, and the third embodiment will be described below using FIGS. 14 to 18. Note that for configuration requirements similar to those in the first embodiment, c will be applied to the same reference signs as those in the first embodiment, and detailed description will be omitted.

Figure 14:
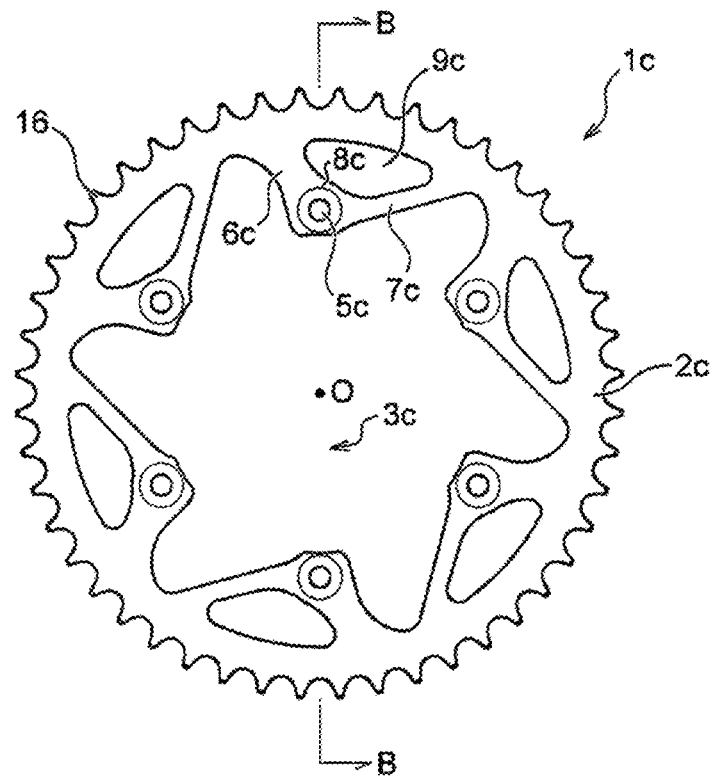
FIG. 14 is a front view of a rotation transmission disc (sprocket) according to a third embodiment of the present invention.
Figure 15:
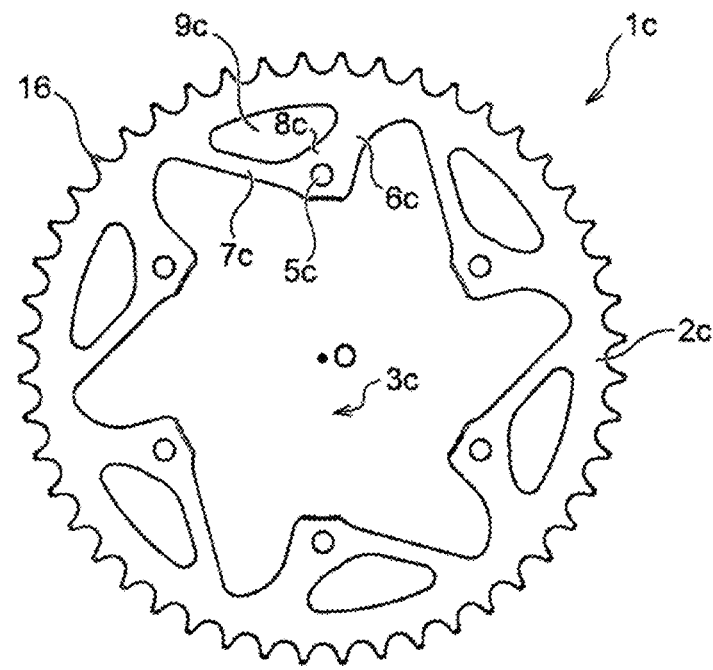
FIG. 15 is a back view of the rotation transmission disc according to the third embodiment.
Figure 16:
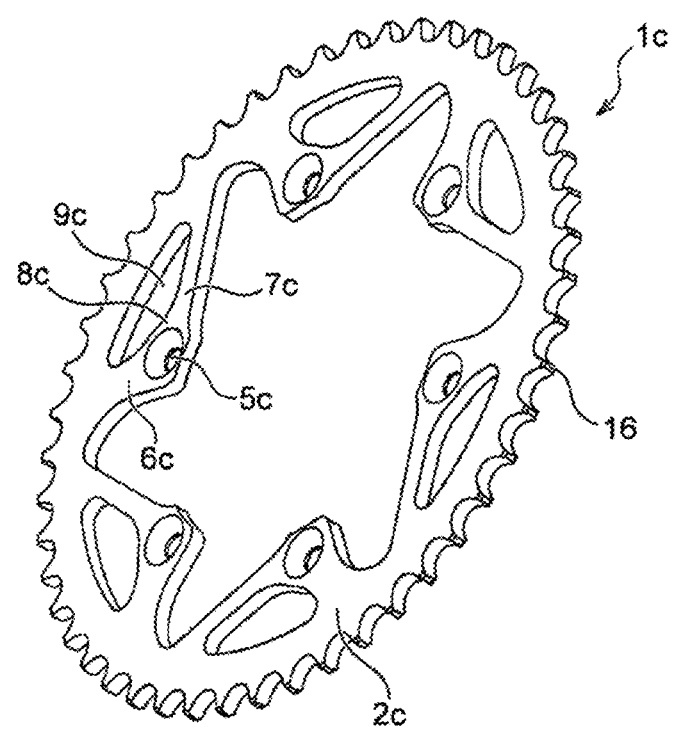
FIG. 16 is a perspective view of the rotation transmission disc according to the third embodiment.
Figure 17:
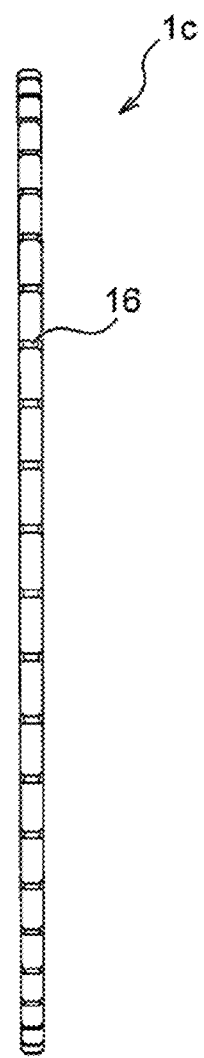
FIG. 17 is a side view of the rotation transmission disc according to the third embodiment.
Figure 18:
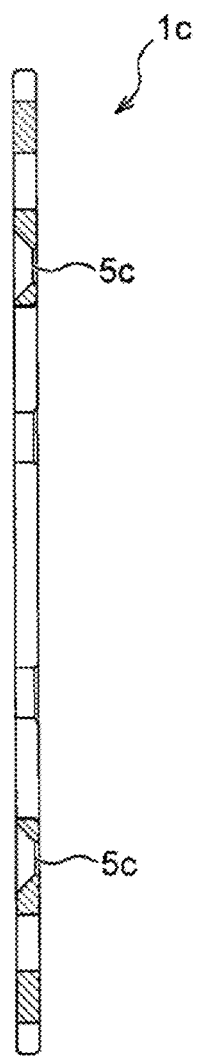
FIG. 18 is a sectional view of the rotation transmission disc according to the third embodiment taken along the line B-B in FIG. 14.

As illustrated in FIGS. 14 to 18, a rotation transmission disc 1c includes an outer circumferential portion 2c, a center opening portion 3c formed inside the outer circumferential portion 2c, and a plurality of attachment holes 5c formed at positions projecting from the outer circumferential portion 2c to the inside of the center opening portion 3c for attachment of the rotation transmission disc 1 to a rotating element (not illustrated) such as a wheel. As is best illustrated in FIGS. 14 to 16, a first crosspiece portion 6c and a second crosspiece portion 7c inside a range of an adjacent divided angle intersect one another, and each attachment hole 5c is located in the intersecting region 8c similarly to the first embodiment. As described in FIG. 6 in regard to the first embodiment, directions in which the first crosspiece portion 6c and the second crosspiece portion 7c extend are determined on the basis of a predetermined angular ratio in the third embodiment as well. Also, the composite arc parts 20 to 24 and the recessed stretching parts 25 to 27 may be formed in the third embodiment as well.

Sprocket teeth 16 are formed at the outer circumferential portion 2c, and an endless rotating chain (not illustrated) is stretched over the sprocket teeth 16. Thus, a load acts on the region of the outer circumferential portion 2c over which the chain is stretched, and a radius region of the outer circumferential portion 2c on which the load is to be applied is defined.

According to the third embodiment, it is possible to provide a sprocket achieving high strength along with a light weight similarly to the first embodiment.

In a case in which the rotation transmission disc 1c that is the sprocket according to the third embodiment is attached to a bicycle or the like, the rotation transmission disc 1 or 1b that is the brake disc according to the first embodiment or the second embodiment may be disposed on the opposite side. It is a matter of course that the present invention is not limited to this application example.

Although the embodiments of the present invention have been described hitherto, the present invention is not limited only to the above examples and can be changed in an arbitrary suitable manner within the scope of the present invention.

For example, although the rotation transmission disc according to the present invention has been described as a brake disc or a sprocket in the above embodiments, the rotation transmission disc according to the present invention can also be applied to other arbitrary discs capable of transmitting a rotation force, for example, clutches, gears other than the sprocket, and the like.

In a case in which the rotation transmission disc according to the present invention is configured as a clutch, the outer circumferential portion is configured to include a clutch surface. In this case, the radius regions of the outer circumferential portions 2, 2b, and 2c to which the load is applied are regions on which a member facing the clutch is to abut.

Also, although the example in which the number of attachment holes is six has been described in the above embodiments, the present invention is not limited thereto, and the number of attachment holes may be smaller than six or may be larger than six in accordance with the wheel or the like to which the rotation transmission disc is attached.

REFERENCE SIGNS LIST 1, 1b, 1c Rotation transmission disc
2, 2b, 2c Outer circumferential portion
3, 3b, 3c Center opening portion
5, 5b, 5c Attachment hole
6, 6b, 6c First crosspiece portion
7, 7b, 7c Second crosspiece portion
8, 8b, 8c Intersecting region
9, 9b, 9c Circumferential opening portion
10, 10b Waveform portion
11, 11b Weight reducing hole
12 Dish-shaped recessed part
13 Crosspiece inner circumferential portion
14 Pin
15 Bridge portion
16 Sprocket tooth

The invention claimed is:

1. A rotation transmission disc comprising:
an outer circumferential portion on which a load acts when rotation is transmitted;
a center opening portion formed inside the outer circumferential portion; and
a plurality of attachment holes formed at positions projecting from the outer circumferential portion to an inside of the center opening portion for attachment of the rotation transmission disc to a rotating element,
wherein a first crosspiece portion and a second crosspiece portion are formed in respective ranges of divided angles each of which is formed by any two adjacent attachment holes with respect to a center of the rotation transmission disc, the first crosspiece portion extending from a load point, which is an intersection between an internally dividing straight line extending in a radial direction to internally divide the divided angle at a predetermined angular ratio and an inner circumferential line with one radius inside a radius region of the outer circumferential portion adapted such that the load is applied, to one of the attachment holes forming the divided angle, the second crosspiece portion extending from the load point to the other attachment hole of the attachment holes forming the divided angle,
the first crosspiece portion and the second crosspiece portion inside a range of an adjacent divided angle intersect one another, and each of the attachment holes is located in an intersecting region,
wherein the rotation transmission disc is a sprocket, and wherein the predetermined angular ratio is 1:2 to 1:4.

2. The rotation transmission disc according to claim 1, wherein sprocket teeth are formed at the outer circumferential portion.

3. The rotation transmission disc according to claim 2, wherein the radius region of the outer circumferential portion adapted such that the load is applied is a region on which the load acts with a chain stretched over the sprocket teeth.

* * * * *